Oct. 14, 1941.     D. B. O'KELLY     2,258,796
VEHICLE DIRECTION SIGNALING APPARATUS
Filed Dec. 10, 1937     2 Sheets-Sheet 1
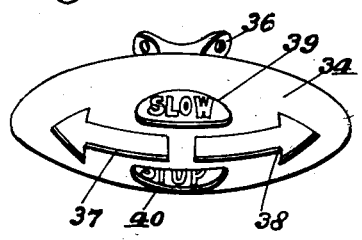
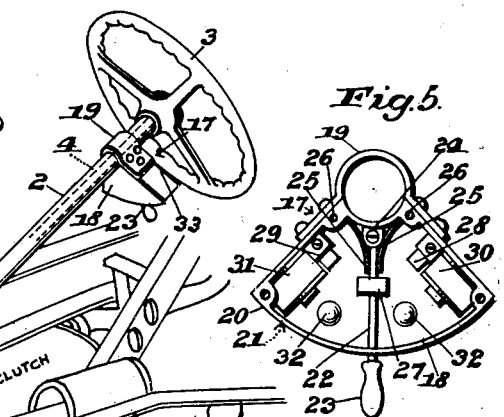
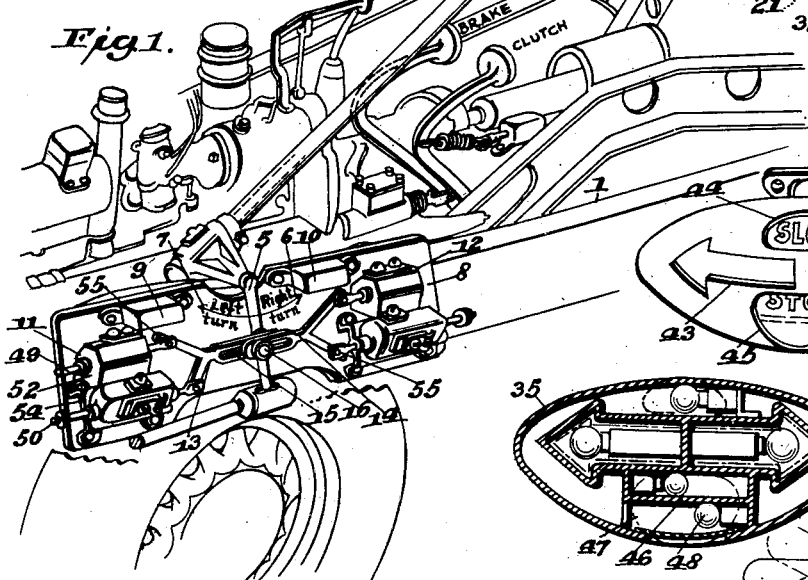
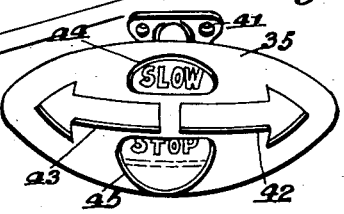
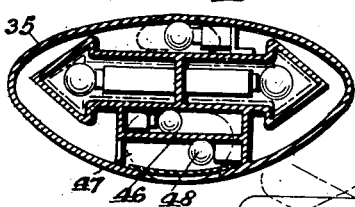
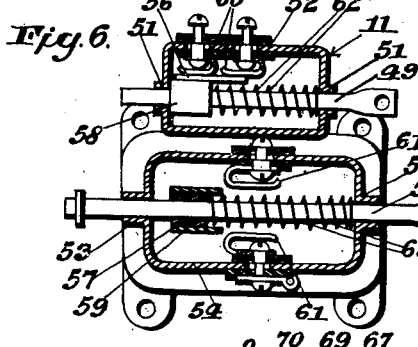
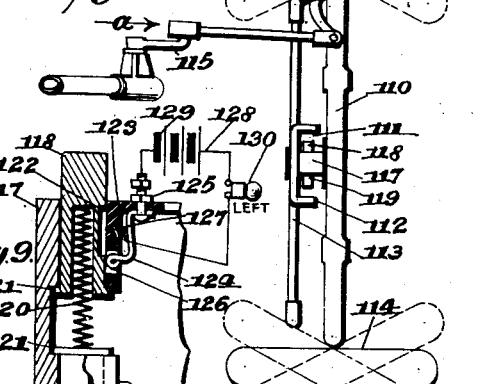
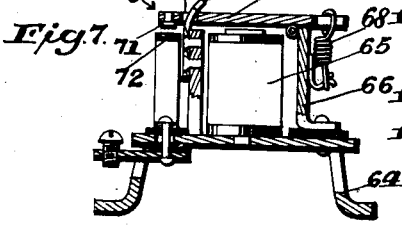
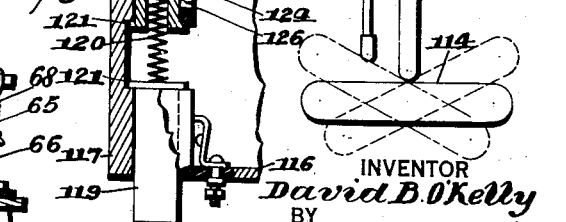
INVENTOR
David B. O'Kelly
BY
Munn, Anderson & Liddy
ATTORNEY

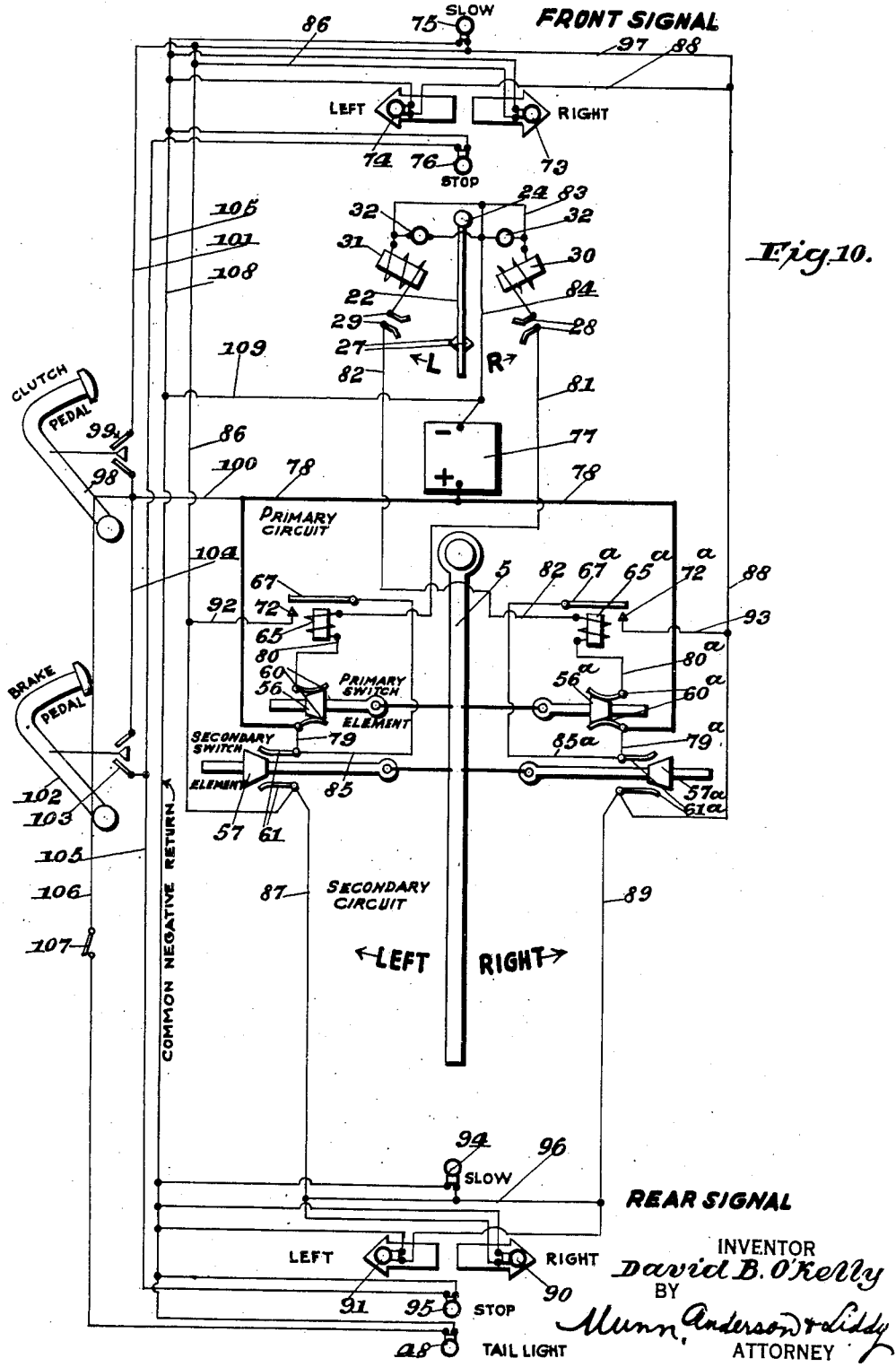

Patented Oct. 14, 1941

2,258,796

UNITED STATES PATENT OFFICE 2,258,796

VEHICLE DIRECTION SIGNALING APPARATUS

David B. O'Kelly, Bishopville, S. C.

Application December 10, 1937, Serial No. 179,212

2 Claims. (Cl. 200—59)

This invention relates to improvements in vehicle direction signaling apparatus, but more particularly to signaling to pedestrians the direction which a driver of an automobile intends to take. At this point it is desired to explain that the construction and functioning of the device is herein described in conjunction with an automobile, but it is to be understood that its principles are adaptable to any vehicle whether motor driven or not, and in the former class it will include trucks, air-craft of all kinds, and even boats.

It is an indisputable fact that many serious accidents are caused on the streets and highways primarily because of confusion in the mind of the pedestrian and all approaching motorists as to which way the approaching automobile is about to turn. Not infrequently a motorist will give a hand signal indicating to the pedestrian and motorist that he is about to turn one way when, actually, the motorist intends and does turn another way. It is easy to see that under such a circumstance the pedestrian can step directly in the path of the approaching vehicle.

The invention is also intended to fortify the assurance and security of the motorist. Having made up his mind as to whether he will turn right or left, he has only to operate the manual device before him in the corresponding manner, whereupon the right or left signal will be displayed to the public, both at the front and rear of the vehicle, making it absolutely certain as to which direction of turn is about to be negotiated. With this preamble in mind the objects of the invention are as follows:

First, to provide a signal for any type of vehicle, whether an automobile, truck, boat or airplane, whereby the driver can indicate the direction of an intended turn.

Second, to provide for the manual selection of the desired signal preparatory to making an intended turn, and to automatically maintain said signal in its direction-indicating condition until the driver completes the turn.

Third, to provide a signaling system wherein a manually operating setting device is so coordinated with an automatically and electrically responsive indicating device that said setting device stays in its operative condition only long enough to await the beginning of the operation of the indicating device, whereupon the setting device is automatically restored to its original position, thus saving electrical current and confusion as to forgetting or neglecting the manual operation.

Fourth, to provide a motor vehicle direction indicating signal which is an improvement on the signal patented by D. B. O'Kelly, No. 1,670,548 of May 22, 1928.

Fifth, to provide a coordinated electrical unit with the manual control, possessing automatic action which, if the driver should for any reason whatsoever neglect or forget to operate the manual control switch, will cause its automatic switches to go into action just as soon as the right or left turn is begun, at such given degree which is predetermined when the device is installed on the vehicle in turn illuminating the directional arrows showing the exact path that the machine or vehicle is going to travel, said semi-automatic action averting a possible accident and general confusion for the driver, whether of an automobile, airplane, boat or other vehicle.

Sixth, to provide a signaling system possessing both manual and automatic action, so coordinated that each system will operate independently of the other, but works and operates conjunctively and in a synchronous harmony with each other, all of which will produce certain necessary action for the best safety methods on streets, highways, air and water travel.

Seventh, to provide in a signaling system a combination of electrical units housed in suitable casings which may be placed on vehicles as best suited to the manufacturer or individual owner or as might be designated by laws governing devices for safety emplacement on motive machines of any kind.

Other objects and advantages will appear in the following specification, reference being had to the accompanying drawings, in which:

Figure 1 is a fractional perspective view of a motor vehicle, particularly illustrating the application of the signal switch-panel to the chassis.

Figure 2 is a perspective view of the front signal casing.

Figure 3 is a perspective view of the rear signal casing.

Figure 4 is a vertical section of the rear signal casing.

Figure 5 is a plan view of the manual steering post switch, the cover being omitted.

Figure 6 is a partially sectional and elevational view of one of the double action steering link operated switches.

Figure 7 is a partially sectional and elevational view of one of the exciter switches or relays.

Figure 8 is a diagrammatic plan view of the steering gear of an automobile illustrating the incorporation of a modified form of directional signaling switch.

Figure 9 is a partially sectional view of the axle-carried member of said switch.

Figure 10 is a diagram of the electrical wiring of the main form of indicating signal.

Reference is first made to Fig. 1, wherein enough of the chassis 1 of an automobile is disclosed to illustrate the application of the invention. The steering column 2 is customarily fixed in place and is surmounted by the steering wheel 3 which is secured to the steering shaft 4, which, at its lower end, has worm gearing (not shown) for turning the steering link 5 according to the directions noted adjacent to the arrows 6, 7, and at the front and rear.

A panel 8 of any suitable description is affixed to the chassis 1 so as to be situated within the zone of operation of the link 5 approximately as shown. This panel carries the assemblage of switches and other mechanism essential to the operation of the signal. It is desired to point out that the proportion of these switches and mechanism are considerably exaggerated in Fig. 1 for the purpose of making the illustration clearer. In practice the entire panel 8 and its carried elements will be fairly small, and in order to protect said elements a cover of any suitable description is intended to be applied.

The panel carries a pair of exciter switches 9, 10, hereinafter known as "right" and "left" relays, and a pair of double action steering link operated switches 11, 12. The latter switches are operated by the link 5 by any suitable connecting means, one embodiment of said means comprising forked links 13, 14, which are longitudinally slotted at their inner ends, as at 15 to ride upon and be actuated by a stud 16, which projects out from the link 5.

From the arrangement shown in Fig. 1 it is readily seen that when the link 5 is swung to cause a right turn of the vehicle, it will be the link 13 that is pulled because of the stud 16 engaging the adjacent closed end of the slot 15. At the same time the stud 16 will ride in the slot of the link 14, leaving the latter idle. The same principle of operation occurs when the link 5 is swung to cause a left turn of the vehicle.

Before proceeding with the description of the details of the switch panel 8, attention is directed to the manually operated steering post switch generally designated 17 (Figs. 1 and 5). This switch comprises a casing 18 which is permenently and fixedly secured to the steering column 2 by a clamp 19. The casing 18 is in the shape of a segment and its arcuate front 20 is slotted at 21 to make room for the swinging of an arm 22 which terminates at its exposed end in a handle 23. The inner end of the handle is pivoted at 24 to a suitable kind of bracket. Leaf springs 25 of equal tension tend to keep the arm 22 in the centralized position shown (Fig. 5). These springs are attached to suitable mounts at 26 and they bear against the sides of the arm.

Said arm 22 has a double contactor 27. One or the other of the contactors is intended to be moved into the contact forks, 28, 29 adjacent to the right and left holding magnets 30, 31. The casing 18 is equipped with pilot lamps 32. The light from these will show through suitable openings in the cover 33 (Fig. 1) of the casing 18, and indicate to the operator that the respective circuits are functioning properly.

Attention is next directed to the front and rear signal casings 34, 35 (Figs. 2, 3 and 4). Each of these is of substantially the same shape. The lines upon which these casings are made are intended to be pleasing and to be in harmony with the general aspect to the front and rear of the automobile.

As regards the front signal casing 34 it is seen in Fig. 2 that this includes a bracket 36 by which the casing is adapted to be secured to the radiator grille or to some other conspicuous part of the automobile at the front. It has cut out places 37, 38 in the form of arrows which point to the right and left. These openings are covered with a suitable transparency. Other openings 39 and 40 respectively above and below the arrows, are covered with transparencies that have the words "Slow" and "Stop" printed on them. The various cut outs will be partitioned off on the inside of the casing 34 and each compartment formed by the partitions will contain a separate lamp as shown at the top of Fig. 10.

Respecting the rear signal casing 35, Fig. 3 shows that this has a bracket 41 similar to the bracket 36 for the purpose of enabling its attachment to the rear of the automobile. Said casing is cut out at 42 and 43 in the form of right and left arrows. There are other openings 44 and 45 respectively above and below said arrows. The system of partitioning is plainly shown in Fig. 4.

Particular attention is directed to the partition 46. This forms part of a separate light compartment 47 which contains the tail light 48. The rear casing 35 therefore not only functions as a signal casing, but it also has the tail light embodied in it, thus making it unnecessary to make a separate provision for a tail light.

It is believed unnecessary to describe the remaining partitions in Fig. 4 in detail. It is sufficient to note that the arrow openings 42, 43, are outlined in the partition system. Each of the resulting compartments contains its own lamp as shown at the bottom of Fig. 10. The various casing openings mentioned are covered with transparencies, showing "right" and "left" arrows. The upper opening is covered with a yellow transparency having "Slow" printed on it and the opening in the lower half of the casing having a red transparency with "Stop" printed on a portion of it.

Attention is next directed to the double action switch shown in Fig. 6. This switch is one of an identical pair, and it may be considered as being the previously mentioned switch 11. This switch has twin rods 49, 50. The rod 49 is guided in matching bearings 51 in the casing 52, for longitudinal sliding motion. The rod 50 is similarly guided in matching bearings 53 on a casing 54 for a longitudinal sliding motion. These rods are pivoted at 55 to the forked link 13 and as the link is moved in the manner described above, both rods 49, 50, will be simultaneously moved accordingly.

These rods respectively carry contactors 56, 57 of primary and secondary switch elements. The latter are appropriately carried by insulating blocks 58, 59. The contactor 56 is in normal engagement with a pair of contacts 60. At the same time the contactor 57 is in disengagement from a pair of contacts 61. Springs 62, 63 actuate the rods 49, 50, so as to tend to keep them in these normal positions. It is only when the link 13 pulls upon the rods 49, 50 that the resistance of the springs is overcome and the relationship of the various contactors and contacts mentioned is changed.

All of the structure just described in connection with Fig. 6 occurs in the companion switch 12

(Fig. 1). It is deemed unnecessary to duplicate the showing of the switch but as regards the switch 12 it will later become necessary to identify the equivalent contactors and contacts with the exponent letter a.

Attention is next directed to Fig. 7. This may be regarded as being a vertical section of the exciter switch 9 (Fig. 1). The internal structure of the exciter switch 10 is to be regarded as identical, but as in the instance of the switch 11, it is later necessary to separately identify with the exponent letter a parts equivalent to some that are about to be described.

The base 64 carries a specially wound electro-magnet 65. The nature of the special winding produces a maximum magnetizing effect with a low consumption of battery current, it being remarked at this point that the energization of the magnet 65 will endure for appreciable periods of time; the length of the period of energization will comprise the time between the instant that the operator manually initiates the direction signal and the instant that the switches in Fig. 6 are operated by turning of steering gear which in turn opens contact 56 and closes contact 57 which deenergizes magnets in Fig. 1 and Fig. 5 and keeps direction arrow lighted until the intended turn is completed.

Reverting to Fig. 7, a bracket 66 upstanding from the base 64, pivotally carries the armature 67. The motion of the armature under tension of the spring 68 is limited by a stop 69 which projects through a hole 70. The armature carries a contactor 71 which is intended to engage a contact 72 when the armature is attracted by the magnet 65.

Reference is now made to Fig. 10. As many as possible of the previously mentioned parts are here marked so as to avoid duplication of description. The front signal includes the "Right," "Left," "Slow" and "Stop" lamps 73, 74, 75 and 65. The battery is designated 77. The steering link 5 turns counterclockwise to cause a right turn of the vehicle and clockwise to cause a left turn. Inasmuch as the corresponding pulls of the links are depended upon to cause right and left signal indications, it follows that the right relay and switch 9 and 11 must be located on the left side of the link. On the same principle, the relay 10 and switch 12 for producing left turning signal indications must be located on the right side of the link 5.

A wire 78, distinguished by heavy lines, connects the positive pole of the battery 77 with one of each of the contacts 60, 60a, of the switches 11, 12. Short branch wires 79, 79a, connect said contacts with the nearest contacts 61, 61a. The companions to the contacts 60, 60a, are connected by wires 80, 80a, to one terminal of each of the electro-magnets 65, 65a. The other terminal of the electro-magnet 65 is connected to one of the contact forks 28 by a wire 81, the companion contact 4 being connected to one terminal of the magnet winding 30.

The other terminal of the electro-magnet 65a is connected to one of the contact forks 29 by a wire 82, the matching fork being connected to one terminal of the electro-magnet 31. Said other terminals of the two electro-magnets 30, 31, are joined by a wire 83 which is connected to the negative pole of the battery 77 by a wire 84. The previously mentioned pilot lamps 32 are connected in parallel across the wires 83, 84, as shown.

A wire 85 connects the contact 61 at the branch wire 79 with the armature 67, a similarly arranged wire 85a connecting the corresponding contact 61a to the armature 67a. The companion contacts 61, 61a are respectively connected by pairs of wires 86, 87, 88, 89, first with the right front signal lamp 73 and the companion right rear signal lamp 90; second, with the left front signal lamp 74 and with the companion left rear signal lamp 91. Short branches 92, 93 connect the wires 86, 93 to the contacts 72, 72a of the relays 9, 10.

The rear signal includes "Slow" and "Stop" lamps 94, 95. A wire 96 connected across the wires 87, 89, has connection with one terminal of the lamp 94. A similarly situated wire 97 connected across the wires 86, 88, also has connection with one terminal of the lamp 75. In addition to their capability of being energized simultaneously with the energization of the "Right" and "Left" lamp sets 73, 90 and 74, 91 because of their being in circuit therewith, the front and rear "Slow" lamps 75, 94, are also capable of energization by the operation of the clutch pedal 98.

This pedal has any suitable kind of a switch 99 connected to it. A branch 100 connects the positive wire 78 to one terminal of the switch, its extension 101 joining the other terminal to the wire 97 which, as previously explained, connects to one side of the lamp 75. Both lamps 75, 94 are energized by the depression of the clutch pedal 98.

The previously mentioned stop light 95 is energized by the depression of the brake pedal 102 much on the order of common practice. This pedal operates any desired kind of a switch 103. A branch 104 connects the positive wire 78 with one terminal of this switch by way of the wire 100, the other terminal of the switch 103 being connected by a wire 105 with one side of each of the lamps 76, 95. The tail light 48 is supplied with current by way of a wire 106 which taps onto the wire 100. The wire 106 connects to the tail lamp terminal on the regular car equipment light switch 107 by which the tail light can be snapped on and off.

Every one of the lamps mentioned, namely 73, 74, 75, 76, 90, 91, 94, 95 and 48 has its second terminal (the latter not having been mentioned previously) connected to the common negative return wire 108 which has a branch 109 that leads to the negative pole of the battery 77 or to the frame of the car in case of a ground return wired car system.

The operation will be readily understood. The description of the operation is largely read on Fig. 10. The invention embraces other structure (Figures 8 and 9) but it is desired to explain the operation of the main invention before proceeding with the latter. Reference is now made to Fig. 10.

Assume that the driver of the vehicle, regardless of what its nature may be, intends to make a right turn. The act of turning is preceded by swinging the handle 23 to the right (arrow R, Fig. 10). As one of the contactors 27 bridges the contact fork 28 current flows as follows: from the positive pole of the battery 77 over wire 78, contacts 60 of the primary switch element, wire 80, magnet 65, wire 81, contacts 28, magnet 30, and wires 83, 84, to the negative pole of the battery. The energization of the magnet 65 attracts the armature 67 and makes contact at 72. The energization of the magnet 30 holds the arm 22 over to the right.

Inasmuch as the relay 9 is in operation the current flow is extended as follows: from wire 78 over wires 79, 85 to the armature 67, and by way of contact 72 and wires 92, 86 and 87 to one terminal of each of the "right" lamps 73, 90, whence there is a return flow to the negative pole of the battery 77 by way of wires 108, 109. The "slow" lamps 75, 94 are energized simultaneously with the "right" lamps 73, 90 by a current flow from the wires 86, 87, over wires 97, 96, and back to the common negative return.

Up to this point it will be understood that when the arm 22 is moved to the right it causes the simultaneous energization of the set of "right" lamps 73, 90, the "slow" lamps 75, 94, causes its self attraction by means of the magnet 30, and maintains the energization of said sets of lamps by the maintenance of energization of the relay 9.

This condition persists until the driver begins making the right turn. As this turn is begun the link 5 swings to the right. The resulting simultaneous pull on the rods 49, 50 of the primary and secondary switch elements firstly closes what might be called an auxiliary lamp circuit, secondly, opens the relay (9) and magnet (30) circuits. Said auxiliary lamp circuit merely comprises the diversion of some of the already flowing current through the contacts 61 and their contactor 57 to the already energized wires 86, 87. All that the secondary switch element does is to close the lamp circuit 73, 90 at a second point. The same motion of the link 5 opens the primary switch element at the contacts 60. This deenergizes the relay magnet 65 and the steering post switch magnet 30. The arm 22 flies back to its centralized position. The deenergization of the magnet 30 represents a saving of current, the arm 22 remaining in the attracted position only as long as the driver pauses before beginning his turn.

The deenergization of the magnet 65 breaks the current flow to the "right" and "slow" lamp sets by way of the wires 85, 92; but, as just stated, there is an auxiliary circuit closure through the secondary switch element, and this switch element keeps said lamp sets energized as long as the driver takes to make the turn.

When the turn is about completed and the vehicle is again on its straight away course, the resulting counter-swinging of the link 5 to its centralized position opens the secondary switch element and restores the primary switch element to its former closure. Said opening causes the deenergization of both "right" and "slow" lamp sets. The closure of the primary switch element places the system in readiness for the next signaling operation.

Should the driver intend to make a left turn the identical sequences described above are repeated in respect to the switch mechanism on the right of the link 5. It is believed unnecessary to describe this in detail because an understanding of the circuit closure and the functioning of the "left" and "slow" lamp sets 74, 91 and 75, 94 is merely a matter of tracing out the current flow. The description of the operation is concluded by merely repeating that the "slow" lamp set 75, 94 is energized with each depression of the clutch pedal 98, and that the "stop" lamp set 76, 95 is energized with each depression of the brake pedal 102.

Reference is now made to Figs. 8 and 9. In lieu of switches mentioned above and where it is desired to have different application of the system, the front wheel axle 110 may carry a switch mechanism 111 which is capable of operation by a U-shaped member 112 that is secured to the tie rod 113. It is this rod which causes the uniform turning of the front wheels 114 when the link 115 is swung by the turning of the steering wheel.

A representative construction adapted for switch 111 is shown in Fig. 9. Here the casing 116 has enlargements 117 which provide adequate bearings for the slidable plungers 118, 119. These plungers are pressed outwardly by a spring 120 and the direction of outward movement is limited by stops 121 on the plungers which engage adjacent parts of the enlargements.

Each plunger has a slot 122 on one side. This slot faces an insulating mount 123 that forms a closure for the adjacent side of the enlargement. Said mount has a spring contact 124 secured to it at the terminal point 125, the free and rounded tip of said contact occupying an opening 126 in the mount in readiness to drop into the slot 122. The mount carries a contact insert 127 from which the contact 124 is normally spaced.

The contacts 124, 127 control a circuit 128 of any desired description, for example, embracing a battery 129 and a "left" lamp 130.

It will be understood that when the link 115 is swung forward (arrow a, Fig. 8) to turn the wheels 114 into the position b to make a left turn, the depression of the plunger 118 will bring the slot 122 into position under the tip of the contact 125, letting the latter drop into the slot and cause an engagement with the contact 127. The resulting closure of the circuit 128 energizes the lamp 130 and indicates the direction of the turn.

I claim:

1. In a vehicle direction indicator, pairs of axially confronting switches, each switch of each pair having a contact rod, a pair of forked links having the forks loosely connected to the respective pairs of rods, and having slotted portions in overlapping relationship to register the slots at the outer extremities of said portions to delineate a hole, and a stud carried by a steering gear-arm which is situated medially of the switch pairs, said stud occupying the hole and being adapted to move idly in one slot in pushing against the contiguous extremity of the other slot when actuating the respective switch pair.

2. In a vehicle direction indicator involving a plurality of signal circuits, pairs of switches for said circuits comprising pairs of casings spaced from each other, the switches including contact rods projecting from the casings and directed into the space between the casings, a steering mechanism operable link situated in said space and being movable with respect to the switches, a compensating forked link for each switch pair, the ends of the forks being pivoted to the respective contact rods, said links including slotted portions directed toward each other and being overlapped to commonly register the slots, and a stud projecting from the steering link through the common slot serving to both support the slotted portions and to actuate a chosen pair of switches.

DAVID B. O'KELLY.